United States Patent [19]

Teske et al.

[11] Patent Number: 4,639,097
[45] Date of Patent: Jan. 27, 1987

[54] APPARATUS FOR THE INSPECTION OF COMBINED READ/WRITE HEADS OF DATA CARRIER DISKS IN EDP INSTALLATIONS

[76] Inventors: Artur Teske, Klaus-Groth-Str. 2, Neu-Wulmstorf; Dietrich A. Klimmeck, Krambekweg 27, D-2359 Henstedt-Ulzburg, both of Fed. Rep. of Germany

[21] Appl. No.: 578,632

[22] Filed: Feb. 9, 1984

[30] Foreign Application Priority Data

Feb. 17, 1983 [DE] Fed. Rep. of Germany ... 8304588[U]
Nov. 4, 1983 [DE] Fed. Rep. of Germany ..... 8311007

[51] Int. Cl.⁴ .................... G02B 21/18; G02B 21/24
[52] U.S. Cl. .................. 350/507; 350/512; 350/574; 350/113; 350/235; 350/623; 350/622; 350/518
[58] Field of Search ............. 350/445, 235–239, 350/245, 243, 574, 577, 623, 618, 622, 616, 617, 113, 116, 507, 512, 635, 486, 518

[56] References Cited

U.S. PATENT DOCUMENTS

| | | | |
|---|---|---|---|
| 843,414 | 2/1907 | Nothrup | 350/113 |
| 1,602,233 | 10/1926 | Lyon | 350/235 |
| 2,307,951 | 1/1943 | Plaut et al. | 350/507 |
| 2,972,283 | 2/1961 | Karnow | 350/235 |
| 3,877,778 | 4/1975 | Heller | 350/623 |

FOREIGN PATENT DOCUMENTS 123603 of 1977 Japan .................. 350/507
209609 1/1924 United Kingdom ............... 350/113

OTHER PUBLICATIONS

V. A. Vesnina et al, "Instrument for Measuring the Depth...", Sov. Jour. of Opt. Tech., vol. 39, No. 1, pp. 33–35, Jan. 1972.

Primary Examiner—Jon W. Henry
Attorney, Agent, or Firm—Cushman, Darby & Cushman

[57] ABSTRACT

An inspection apparatus for the read/write heads of data carrier disks in electronic data processing equipment is provided with a mirror holder with approximately two parallel sides between which extends a deviating mirror and a viewing mirror and at least one lamp is arranged on one side; a positive lens is positioned approximately at right angles to the optical path from the viewing mirror to the deviating mirror, the focal length of which is greater than the optical path from an object to be observed in the vicinity of the viewing mirror to the principal plane of the positive lens; a prism mirror may be placed in the plane of symmetry which extends through the mid point of the second mirror to facilitate viewing.

7 Claims, 10 Drawing Figures

APPARATUS FOR THE INSPECTION OF COMBINED READ/WRITE HEADS OF DATA CARRIER DISKS IN EDP INSTALLATIONS

BACKGROUND OF THE INVENTION

The invention relates to an apparatus for the inspection of combined read/write heads of data carrier disks in EDP installations.

Data carrier disks are conventionally used for data storage purposes in large EDP installations. Data can be transferred to such disks or pulled therefrom by means of read/write heads. For this purpose, the read/write heads are placed at a limited distance above the data carrier disks. Thus, in one arrangement which is conventionally used by Control Data Corp. (CDC), they are placed at the ends of brackets which pass above and below a horizontally positioned data carrier disk and can be moved in the direction of the centre of the disk. For surface protection purposes, the read/write heads have ceramic coatings and dust particles or other contaminants can easily collect thereon. This is particularly to be feared when replacing data carrier disks and can lead to the destruction of the disk. Thus, at least in connection with all exchangeable disk stacks in EDP installations, it is necessary to check read/write heads prior to introduction of a new exchangeable disk stack and also continuously during operation for dirt and dust deposits and to remove the latter. This has hitherto only been possible through the disassembly of the read/write heads, which constitutes a relatively complicated and time-consuming operation, which leads to an undesirably long disconnection of the EDP installation.

SUMMARY OF THE INVENTION

The problem of the present invention is to provide an apparatus for the inspection of read/write heads of data carrier disks in EDP installations, which makes it possible to rapidly and simply inspect the fitted read/write heads, without any complicated assembly and disassembly work being necessary.

The present invention therefore relates to an apparatus for the inspection of combined read/write heads of data carrier disks in EDP installations, wherein it comprises a mirror holder with two approximately parallel sides, between which extend a deviating mirror and a viewing mirror, at least one lamp arranged in at least one side, and a positive lens approximately at right angles to the optical path from the viewing mirror to the deviating mirror and whose focal length is greater than the optical path from an object to be observed in the vicinity of the viewing mirror to the principal plane of the positive lens.

Thus, in the fitted state, the read/write heads can be checked for contamination or breakages, by inserting the apparatus with its viewing mirror between the heads and supplying power to the lamp or lamps. As a result of the approximately right-angled arrangement of the positive lens to the optical path from the viewing mirror to the deviating mirror, it is possible to inspect without difficulty both the upper and the lower read/write head.

Preferably the viewing mirror is a prism mirror, whereof one face permits the observation of the upper read/write head and the other face simultaneously permits the observation of the lower read/write head.

In another embodiment, the viewing mirror is a pivoting mirror with one or two reflecting surfaces. In the case of two reflecting surfaces, they are in parallel planes and, in the case of an appropriate pivoting action, enable the pivoting mirror to successively observe the lower and upper read/write head.

Preferably guidance projections are provided on the inner faces of the sides of the mirror holder and have horizontal upper and lower edges which serve to spread apart the mounts of the read/write heads to be inspected and at the same time contribute to the guidance of the mirror holder.

According to one embodiment of the invention, the sides of the mirror holder are much higher than the spacing of the read/write heads, so that the apparatus can only be inserted from the front between the ends of said heads, when the disk is removed.

According to another embodiment, the height of the mirror holder sides is the same or less then the spacing of the read/write head mounts, so that the mirror holder can be inserted from the side between the read/write heads. This has the advantage that the read/write heads only have to be moved back from the disks, without it being necessary to remove the latter. In this embodiment, a further deviating mirror is appropriately provided, which deflects the optical path running parallel to the bisectrix of the centre line of the read/write heads in the viewing position for the latter to a barrel support for the positive lens.

Instead of a single lamp, it is possible to provide two or more lamps, which are fitted in the sides of the mirror holder, e.g. in the guidance projections and which bring about a glancing illumination of the read/write heads from the side.

To obtain a magnification of about 10 in a fourth and fifth embodiment of this invention a microscope is used instead of a positive lens forming a magnifier.

Further advantageous developments of the invention can be gathered from the following specific description and the claims.

BRIEF DESCRIPTION OF THE DRAWINGS

The invention is described in greater detail hereinafter relative to the drawings, which show.

DETAILED DESCRIPTION OF THE INVENTION

Figure 1:
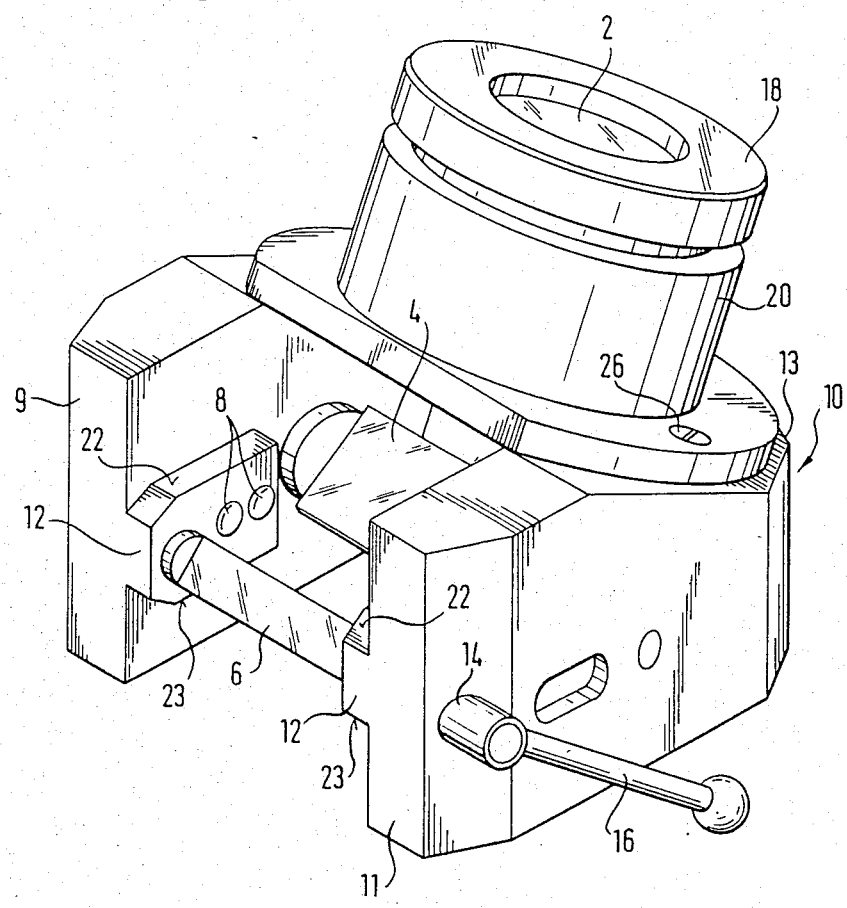
FIG. 1 a perspective view of a first embodiment of a mirror holder to be inserted from the front between the free ends of the read/write heads.

In all the drawings, the same parts are given the same reference numerals in all the embodiments.

FIG. 1 shows an apparatus for inspecting read/write heads of data carrier disks in EDP installations with a mirror holder 10, which has two approximately parallel sides 9, 11, which are interconnected by a rear wall 13 and are open at their end opposite to wall 13, so that they are U-shaped in plan view. In the facing faces, sides 9 and 11 have guidance projections 12, which have parallel upper edges 22 and lower edges 23, which are used for keeping spaced apart by means of their mounts two read/write heads of EDP installations fitted in superimposed manner at the ends of brackets. To assist in inserting the guidance projections 12 between the aforementioned read/write heads the guidance projections 12 are chamfered at their front ends which are remote to the rear wall 13, as is shown in FIGS. 1 through 4 and 9. Such read/write heads for data carrier disks are well known and are for example used in the data stores of Control Data Corp.

At the front end of sides 9 and 11 and consequently spaced from rear wall 13, a pivoting mirror 6 is mounted in a pivot pin 14, whereof one end, e.g. the left-hand end, is mounted in the left-hand side 9, whilst its right-hand end extends outwards through guidance projection 12 and the right-hand side 11. At the free, outer end of pivot pin 14 is fitted a pivoting lever 16, which permits a manual pivoting of pivoting mirror 6 by an angle of up to 180°. The length of pivoting mirror 6 approximately corresponds to the spacing of the guidance projections 12 of mirror holder 10 and consequently approximately to the width of the read/write heads. However, its thickness is so small that the pivoting mirror 6 which is parallel to the read/write heads can be inserted between them without any risk of coming into contact with their surfaces. In the first embodiment, the thickness of the pivoting mirror 6 is consequently less than the height of guidance projections 12. The mounts for the read/write heads rest on the upper edges 22 or lower edges 23 thereof during inspection. The height of sides 9, 11 is significantly greater than the distance between the upper edges 22 and the lower edges 23 of guidance projections 12, so that it is only possible to insert the mirror holder 10 from the front between the free ends of the brackets carrying the read/write heads.

A deviating mirror 4 is installed between sides 9, 11 of mirror holder 10 and is horizontally spaced from the pivoting mirror 6. Although it is secured in position, it can be turned for setting purposes. However, in operation, once its position has been set, this cannot be modified. According to FIG. 2, deviating mirror 4 forms with the lower edge 15 of mirror holder 10 an angle of between 30° and 60°, preferably 35° to 45° and more specifically 38°. As a result the optical path is deflected upwards from pivoting mirror 6 to deviating mirror 4 and is directed on to a positive lens 2. Thus, the optical axis of positive lens 2 forms an angle of approximately 90° with the optical path from pivoting mirror 6 to deviating mirror 4. The positive lens is fitted in a lens barrel 18, which in a barrel support 20 can be adjusted in the direction of deviating mirror 4, e.g. by means of a thread 3. In addition, the focal length of positive lens 2 is greater than the optical path from upper edge 22 or lower edge 23 of guidance projection 12 across pivoting mirror 6 and deviating mirror 4 to the principal plane of positive lens 2. Thus, positive lens 2 constitutes a focussable magnifier for an object to be observed with the aid of the pivoting mirror 6.

Mirror holder 10, barrel support 20 and lens barrel 18 are, according to one construction, made from plastic, preferably by an injection moulding process, which represents an economic procedure. Lamps 8, deviating mirror 4 and pivoting mirror 6 can be inserted in a simple manner in bores in mirror holder 10, so that the complete apparatus can be manufactured in an economic manner.

According to one construction, the pivoting mirror 6 is silvered on one side, so that the same reflecting surface can be used for observing the upper and lower read/write head. In another construction, the pivoting mirror is a bimirror with parallel reflecting surfaces, so that on observation from not shown read/write heads, the pivoting lever 16 need only be pivoted over a relatively small angular range, which is also appropriately limited by a not shown upper and lower stop. It is obvious how such stops can be fitted to the outside of one of the sides 9 or 11, e.g. on side 11.

Figure 2:
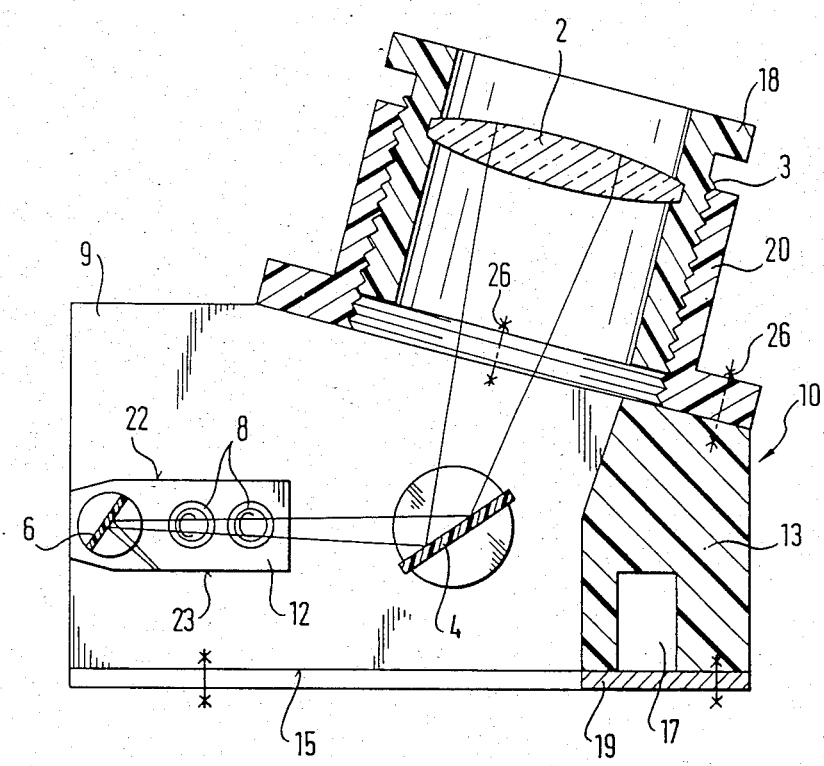
FIG. 2 a vertical section through the embodiment of FIG. 1.

FIG. 2 also shows a base plate 19, which closes a cable duct 17. Cable duct 17 is shaped into the mirror holder 10 and receives not shown cables, which supply power to lamps 8. For this purpose, the cables are connected by one end to lamps 8, whilst the other end is connected to a not shown, per se known jack. According to one construction, the jack is a banana jack. In one construction, the barrel holder 20 is screwed by three screws 26 to mirror holder 10.

Figure 3:
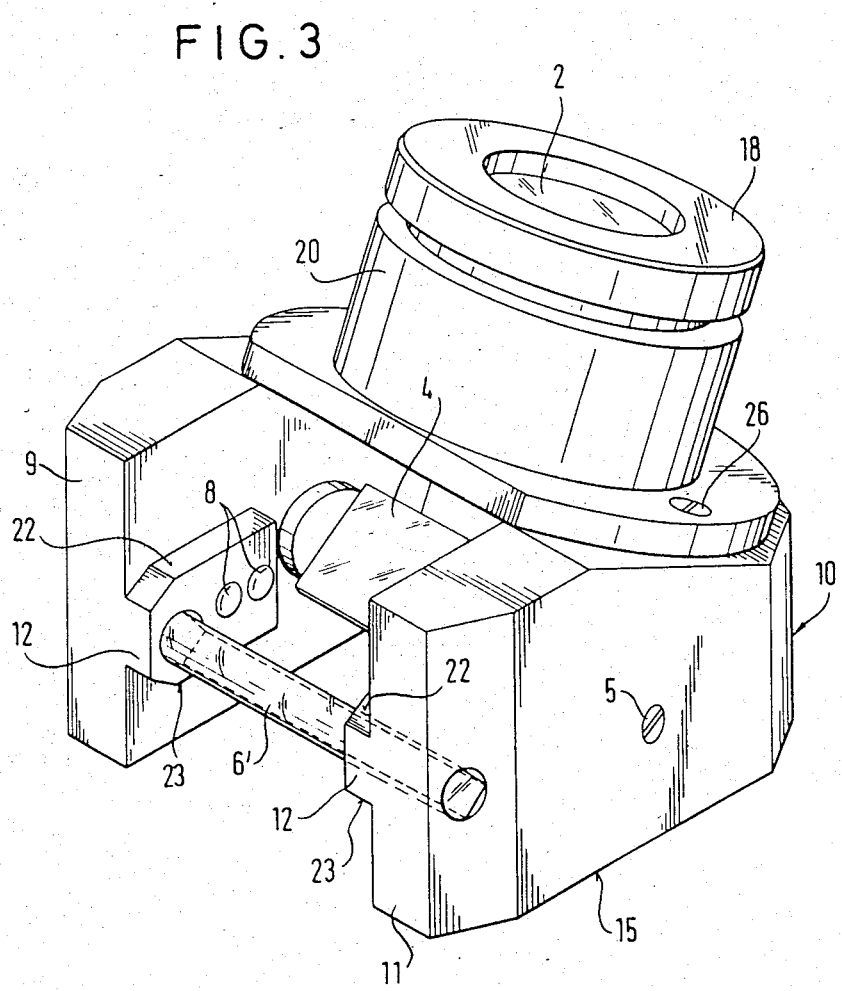
FIG. 3 a perspective view of a second embodiment.
Figure 4:
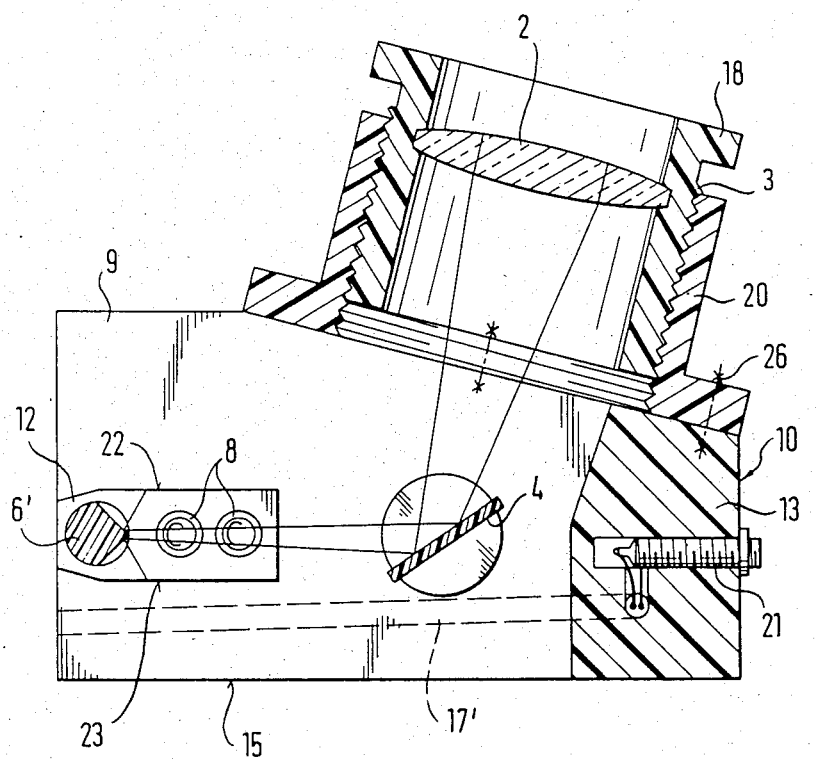
FIG. 4 a vertical section through the embodiment of FIG. 3.

FIG. 3 shows a second embodiment of the invention, in which the pivoting mirror 6 of the embodiment according to FIGS. 1 and 2 is replaced by a prism mirror 6'. Prism mirror 6' has an angle of preferably 90°, but a smaller or larger mirror angle is also possible. All that is important is that both the upper and lower read/write heads can be simultaneously observed. According to one construction, the prism mirror 6' is worked from a round bar, for which purposes the ends of the latter can be inserted in bores of the guidance projections 12. According to FIG. 4, the prism mirror 6' is aligned in such a way that its plane of symmetry is parallel to the upper edge 22 or lower edge 23 of guidance projection 12, so that it centrally intersects deviating mirror 4. Thus, simultaneously light beams from the upper and lower reflecting surfaces of prism mirror 6' can be deflected to positive lens 2 via deviating mirror 4. For adjusting the spacing of positive lens 2 from deviating mirror 4 and consequently for shortening or lengthening the optical path from an object to be observed by means of a prism mirror 6' and deviating mirror 4, the positive lens 2 with its lens barrel 18 can be vertically adjusted by the thread 3 in barrel carrier 20.

Deviating mirror 4 can be set by means of a setscrew 5 shown in FIG. 3. However, after setting has been carried out by the manufacturer, there should in principal be no further change to the setscrew 5.

Barrel carrier 20 is connected to mirror holder 10 and in one construction is e.g. screwed to it by e.g. three screws 26, which are merely intimated in the present case. Once again power is supplied to lamps 8 by means of not shown electrical leads or cables, which lead from lamps 8 through cable duct 17' to a jack 21. For example, jack 21 is a banana jack, which permits the connection of a two-conductor cable. If, as indicated in the embodiment according to FIG. 4, cable duct 17' passes through sides 9 and 11 at a distance above lower edge 15, there is no need to provide a base plate 19, as in the embodiment according to FIG. 2.

FIGS. 5 to 8 show a third embodiment of the invention, which is provided for lateral insertion between the mounts of read/write heads. This embodiment has a frame, bent approximately by 90° with side walls 9' and 11', whose height approximately corresponds to the spacing of the read/write head mounts and which consequently approximately have the height of guidance projections 12 of the embodiment according to FIGS. 1 to 4. Thus, side walls 9' and 11' can be inserted between the read/write head mounts and it is possible to observe a ceramic wafer 25 shown in dotted line of a read/write head in a retracted position with respect to a disk, without having to remove said disk.

At the front end of side walls 9' and 11' is provided a connecting rod 28 which interconnects the two side walls 9' and 11' and gives strength to the mirror holder 10'. At a limited distance behind connecting rod 28 in the direction of a further deviating mirror 24, is once again provided a prism mirror 6'. In front of the prism mirror 6' and in each side wall 9' and 11' are provided two lamps 8, which are used for the glancing illumination of the read/write heads. Once again, the prism angle of prism mirror 6' is preferably 90°, but can also vary therefrom. The most appropriate construction involves an angle of 90°.

Figure 6:
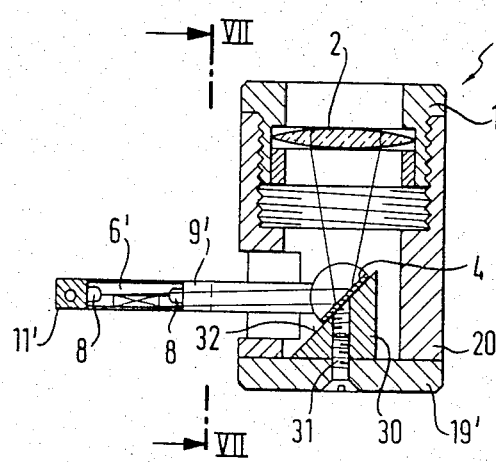
FIG. 6 a section along line VI—VI of FIG. 5.
Figure 7:
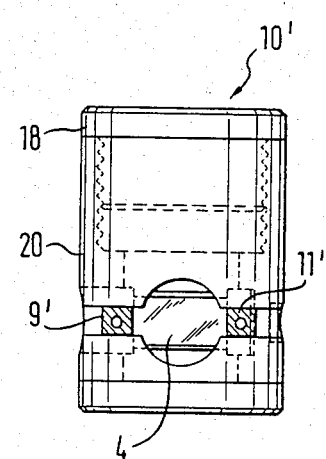
FIG. 7 a section along line VII—VII of FIG. 6.
Figure 5:
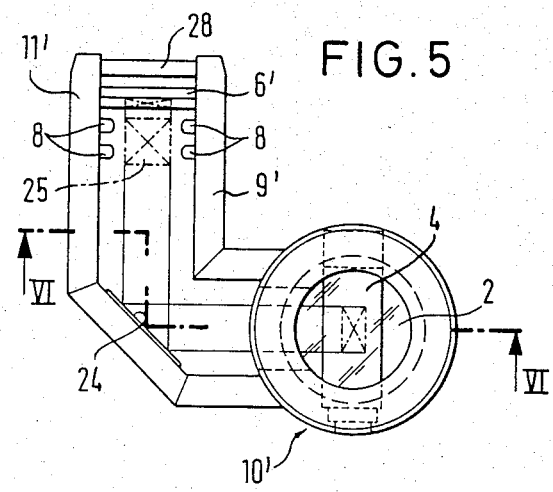
FIG. 5 a diagrammatic plan view of a third embodiment for the lateral insertion between associated read/write heads.
Figure 8:
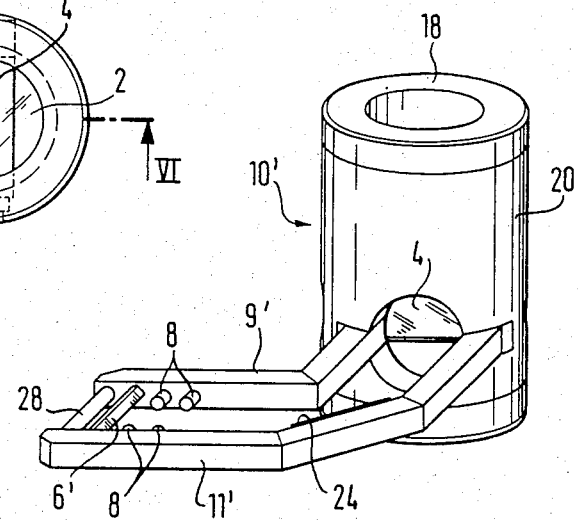
FIG. 8 a perspective view of the third embodiment according to FIGS. 5 to 7.

According to another, not shown construction, prism mirror 6' of the embodiment according to FIGS. 5 and 6 can be replaced by a pivoting mirror as in the embodiments according to FIGS. 1 to 4.

According to another construction, the further deviating mirror 24 is a plane mirror, whilst in another, not shown construction it is a prism mirror. The optical path from the ceramic wafer 25 of the upper or lower read/write head is consequently passed via prism mirror 6' to the further deviating mirror 24 and from there is deflected to the first deviating mirror 4, which guides the optical path from the object to be observed through positive lens 2.

Barrel carrier 20 is constructed in the embodiment according to FIGS. 5 and 6 in much the same way as in the embodiments according to FIGS. 1 and 2 and is not therefore explained again. In per se known manner, lamps 8 are again supplied with power by electrical cables in not shown cable ducts.

In the emobidments according to FIGS. 5 through 8 the deviating mirror 4 is not supported by a rotatable rod like element as shown in the embodiments according to FIGS. 1 through 4 and 9, but by a prism 30 which is secured to the base plate 19' of the mirror holder 10' within the interior of the mirror holder 10' by means of a screw 31. The screw 31 engages the prism 30 by extending from below through the base plate 19'. It is well understood that the prism 30 can be attached to the base plate 19' by any other means known to the expert in the art, e.g. by means of adhesive bonding; in another embodiment it is formed integrally to the base plate 19'. The prism 30 has a slanted front face 32 which is slanted such that a deviating mirror 4 secured onto said front face 32 establishes the desired beam deflecting angle of approximately 90° from the prism mirror 6' to the positive lens. The purpose of the prism 30 is to facilitate mounting of the deviating mirror 4 such that it can be attached to the front face 32 by means of an adhesive which does not cure immediately and allows adjusting of the deviating mirror 4 relative to the prism mirror 6' and to the positive lens 2. After adjusting of the deviating mirror 4 the adhesive will be allowed to cure and thereby to fix the position of the deviating mirror 4.

Figure 9:
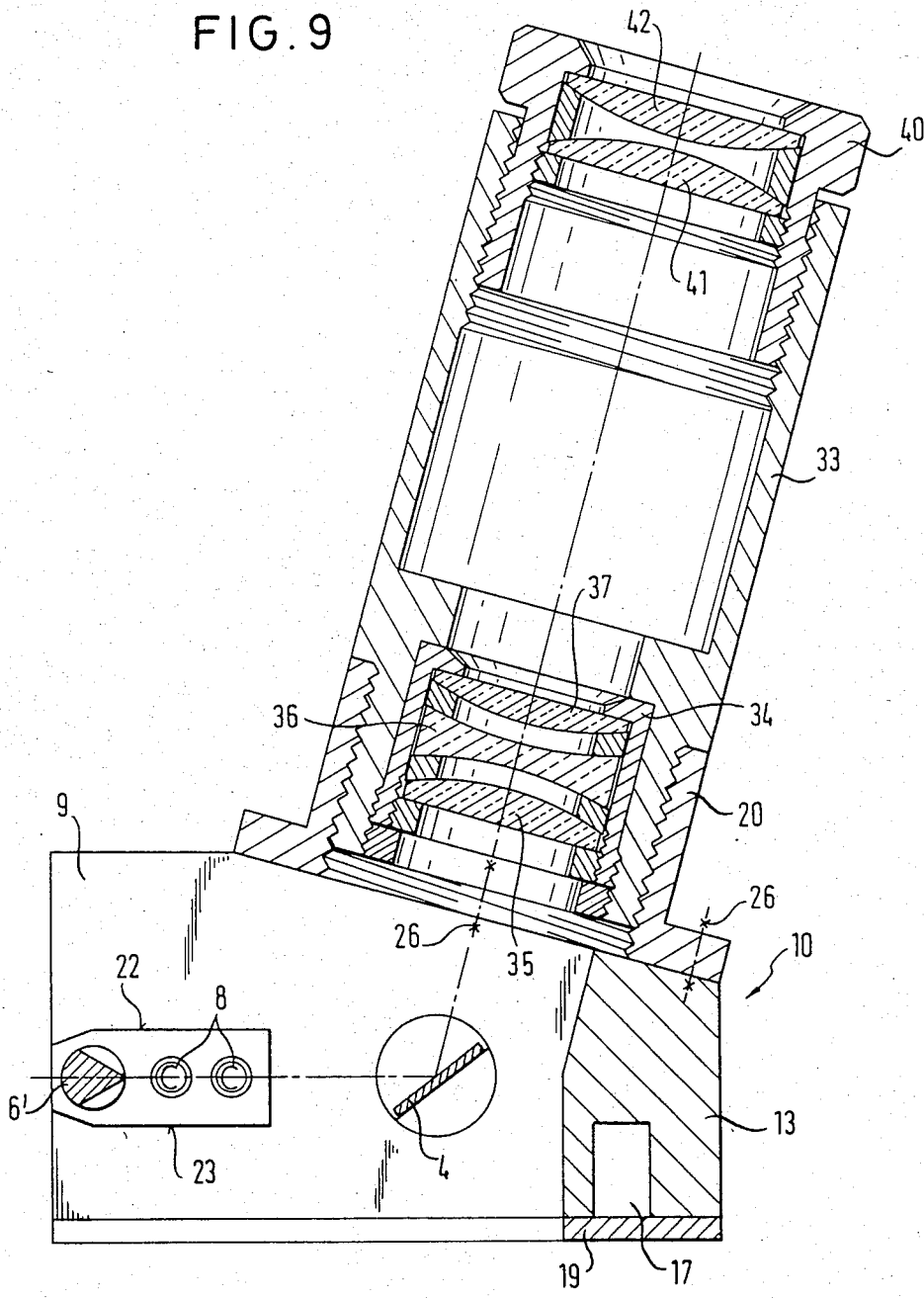
FIG. 9 a fourth embodiment of the invention.
Figure 10:
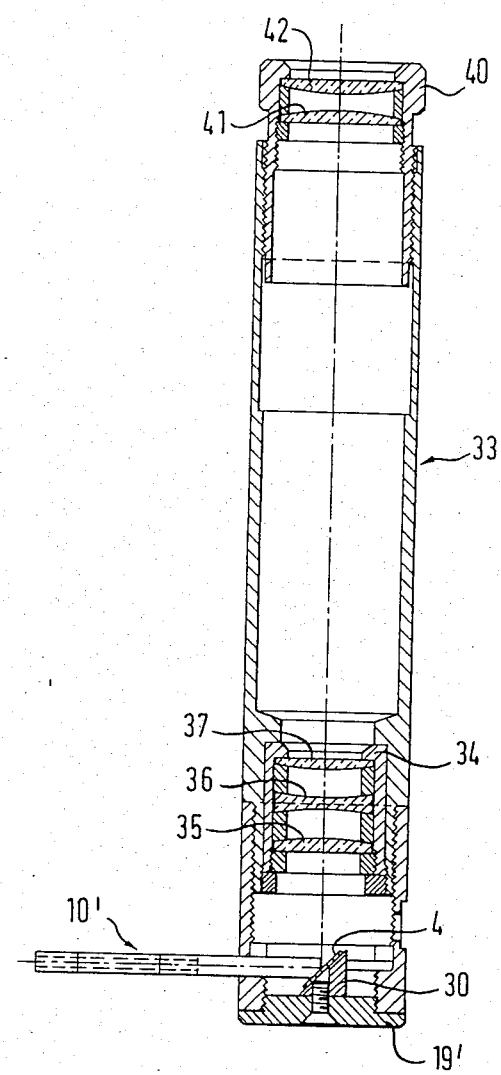
FIG. 10 a fifth embodiment of the invention.

FIGS. 9 and 10 show further embodiments of the invention wherein a microscope 33 is used instead of the positive lens 2 according to the embodiments of FIGS. 1 through 8 to obtain a magnification of about 10 of the object to be inspected. Since the positive lens 2 of the embodiments according to FIGS. 1 through 8 can not be moved very closely towards a read/write head to be inspected its focal length is limited and therefore also its magnification. Said magnification is limited to approximately a factor of 2 in the embodiments shown in FIGS. 1 through 8. This will not be sufficient for detecting very small contaminations or damages on the read/write heads and therefore a magnification of about 10 is sometimes required.

Accordingly in the embodiment shown in FIG. 9 a microscope 10 is inserted into the barrel holder 20 of the mirror holder 10. The microscope 33 includes an objective 34 and an eye piece 40. The microscope 33 is preferrably threadedly connected to the barrel holder 20. The objective 34 comprises in one embodiment a first positive lens 35, a negative lens 36 and a second positive lens 37 which are separated by spacer rings well known in the art. The first and second positive lens 35 and 37 are planoconvex lenses as are third and fourth positive lenses 41 and 42 forming the eye piece 40, the plane surfaces of the lenses facing opposite directions in both the objective 34 and in the eye piece 40. The negative lens 36 mounted between the first and second positive lens 35 and 37 is a biconcave lens. The optical axis of the microscope 33 forms an angle of about 100° to 120° with the optical axis extending from the prism mirror 6' to the deviating mirror 4. This facilitates inspecting the read/write heads since sometimes parts of the disk housing prevents from looking at read/write heads in an angle of 90°.

The embodiment according to FIG. 1 corresponds primarily to the embodiments according to FIGS. 5 through 8 with the microscope 33 again attached to the mirror holder 10' instead of the magnifier to obtain a magnification of ~10 of the object to be inspected. In this embodiment the optical axis of the microscope 33 extends perpendicularly to the optical axis extending through the prism mirror 6' and trough the deviating mirror 4.

The appropriate arrangement and selection of the lenses for the microscope 33 is obvious for one skilled in the art and can be determined without difficulties if the desired magnification has been selected.

What is claimed is:

1. An apparatus for the inspection of combined read/write heads of data carrier disks in data processing installations, comprising:
    a mirror holder, having a first side and a second side, said first side having a first area, a second area coupled to said first area and forming an angle of substantially 45 degrees therewith, and a third area, coupled to said second area and forming an angle of substantially 45 degrees therewith, and said second side having a first area, and a second area, coupled to said first area at a substantially right angle;
    prism mirror means, extending between said first area of said first and second sides of said mirror holder, respectively;
    a second mirror, coupled to said second area of said first side;
    said prism mirror means having an upper mirror surface and a lower mirror surface extending at a selected angle to said upper surface, and a plane of symmetry which extends through a midpoint of said second mirror, for simultaneously reflecting light from both an upper surface and a lower surfce of said object to be observed toward said second mirror;

a first optical path extending between said prism mirror means and said second mirror and an object to be observed being disposed in the vicinity of said prism mirror means, so that said prism mirror means reflects an optical sample of said object to be observed toward said second mirror;

a third mirror extending between said third area of said first side and said second area of said second side, light from said second mirror being coupled toward said third mirror;

first and second illuminating means, disposed on said first and second sides of said mirror holder, respectively near said prism mirror means, for illuminating said vicinity of said prism mirror means, to enable a better optical sample to be transmitted; and lens means, disposed at an angle to said first optical path, light from said third mirror being coupled toward said lens means, and a focal length of said lens means being greater than a length of a second optical path which extends from said object to be observed in the vicinity of said prism mirror means to a principal plane of said lens means.

2. An apparatus as in claim 1 further comprising focusing means for varying said length of said second optical path by displacing said lens means from a rest position thereof.

3. An apparatus as in claim 1 wherein said lens means is a positive lens.

4. An apparatus according to one of the claims 1, wherein guidance surfaces for spreading apart the read/write head mounts are provided on the facing faces of said sides.

5. The apparatus as claimed in claim 1, wherein the apparatus is to be used with read/write heads having a selected vertical space between said heads, the length of said prism mirror corresponding approximately to the spacing between said sides of said prism mirror holder and the height of said prism mirror being less than said selected vertical spacing between said read/write heads.

6. An apparatus as in claim 1 wherein said lens means is a microscope.

7. The apparatus as claimed in claim 6 wherein the magnification factor of said microscope is approximately 10.

* * * * *